(No Model.)
L. EBERHART & I. D. STEVENS.
DOOR HANGER.
No. 278,692. Patented June 5, 1883.
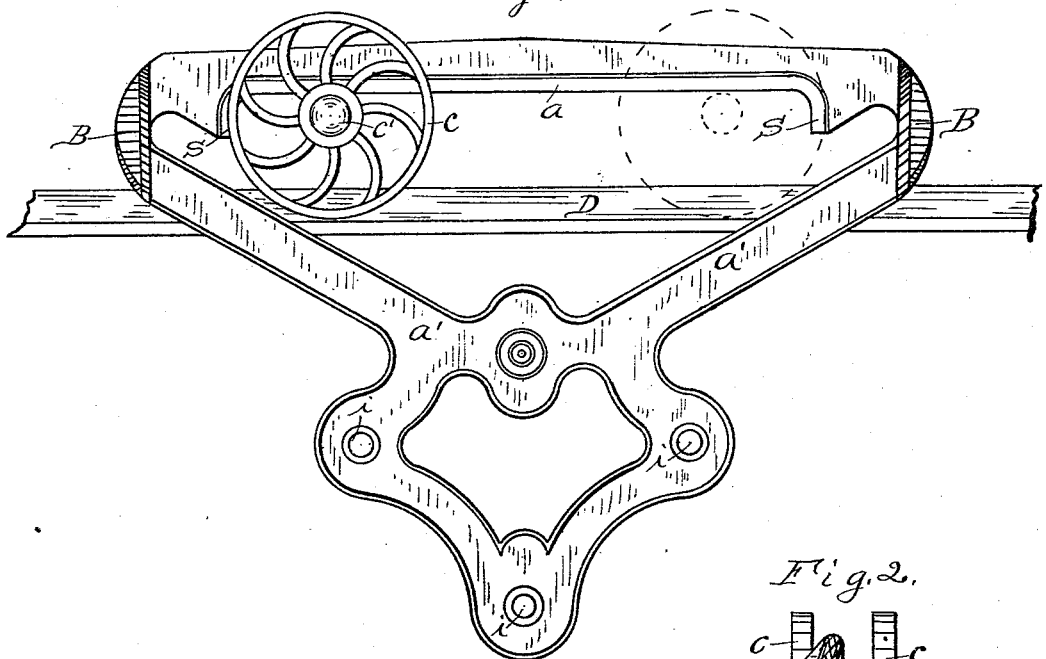
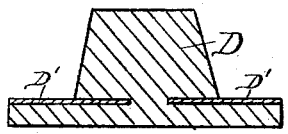
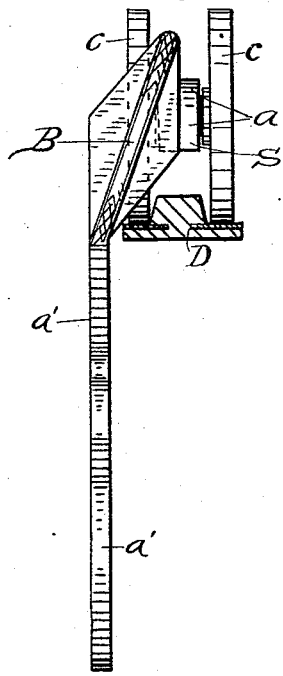
Witnesses
Thos. H. Hutchins
Wm. J. Hutchins
Inventors.
Lloyd Eberhart.
Irving D. Stevens.

UNITED STATES PATENT OFFICE.

LLOYD EBERHART AND IRVING D. STEVENS, OF JOLIET, ILLINOIS.

DOOR-HANGER.

SPECIFICATION forming part of Letters Patent No. 278,692, dated June 5, 1883.

Application filed February 13, 1883. (No model.)

*To all whom it may concern:*

Be it known that we, LLOYD EBERHART and IRVING D. STEVENS, of the city of Joliet, in Will county and State of Illinois, have jointly invented certain new and useful Improvements in Door-Hangers, the construction and operation of which we will proceed to explain, reference being had to the annexed drawings, and the letters and figures thereon, making a part of this specification, in which—

Figure 1 is a side elevation, Fig. 2 an end elevation, and Fig. 3 a cross-section, of the track.

This invention relates to certain improvements in door-hangers of that class usually called "barn-door hangers," and relates particularly to the construction of the frame which attaches to the side of the door and rides on the axle of a double-tread wheel. We are aware that such wheels and such a rider-bar to ride on the axle of the wheel have been in use before, and hence do not claim to have in- invented those features.

Referring to the drawings to more fully illustrate the particular features and improvements we have made, $a'$ represents the frame proper of the hanger. $a$ represents that portion of the frame called the rider-bar; $c$, a double-tread wheel having the axle $c'$, on which the rider-bar $a$ rides; S, bumpers to prevent the wheel from coming in contact with the ends B of the frame $a'$; and D, the track, having two treads and an elevated ridge or guide between the treads, upon which the wheel $c$ rolls.

The particular features we have invented consist in the construction of the track and the diagonal part or ends B B, which connect the frame $a'$ with the rider-bar $a$, and which is shown particularly in Fig. 2.

Heretofore the frame $a'$ has usually extended upward and over the top of the wheel and then bent or turned downward to rest on the axle of the wheel. A frame constructed in that manner will invariably break off at some one of the angles above the wheel, and is not as strong as one constructed like this. In this case the rider-bar $a$ extends beyond the bumpers S, so that its outer ends may be connected by means of the diagonal ends with the frame $a'$ below, which frame $a'$ does not extend farther up than about to the track D. By this construction the upper end of the frame $a'$ hangs practically directly on the axle $c'$, dispensing with the usual hooked upper end over the wheel, thus forming a decidedly stronger, neater, and more durable hanger every way. It is simply in this end piece, B, connecting the parts, as stated, that we claim to have made any improvement or invention in the hanger, but this feature is of a very decided advantage, as practical tests have verified.

Having thus described our invention, what we claim as new, and desire to secure by Letters Patent, is as follows, to wit:

The door-hanger $a'$, having the diagonal end pieces, B B, for connecting said hanger with the outer ends of the rider-bar $a$, as and for the purpose set forth.

LLOYD EBERHART.
IRVING D. STEVENS.

Witnesses:
THOS. H. HUTCHINS,
WM. J. HUTCHINS.